United States Patent [19]

Liu

[11] Patent Number: 5,130,530
[45] Date of Patent: Jul. 14, 1992

[54] REAL TIME PRE-DETECTION DYNAMIC RANGE COMPRESSION

[75] Inventor: Hua-Kuang Liu, Pasadena, Calif.

[73] Assignee: The United States of America as represented by the Administrator, National Aeronautics and Space Administration, Washington, D.C.

[21] Appl. No.: 633,746

[22] Filed: Dec. 19, 1990

[51] Int. Cl.⁵ .............................................. H01J 3/14
[52] U.S. Cl. ...................................... 250/216; 359/241
[58] Field of Search ............................ 250/216, 201.8; 350/347 R, 347 E, 353, 354, 355; 359/240, 241

[56] References Cited

U.S. PATENT DOCUMENTS

| | | | |
|---|---|---|---|
| 3,712,985 | 1/1973 | Swarner et al. | 250/216 |
| 3,912,291 | 10/1975 | Fleisher et al. | 355/54 |
| 4,016,563 | 4/1977 | Pedinoff | 343/5 SA |
| 4,140,393 | 2/1979 | Cetas | 356/43 |
| 4,215,576 | 8/1980 | Quick et al. | 73/356 |
| 4,338,516 | 7/1982 | Sharma | 250/226 |
| 4,772,785 | 9/1988 | Cheng et al. | 250/216 |
| 4,915,503 | 4/1990 | Pavlath | 356/350 |

Primary Examiner—David C. Nelms
Assistant Examiner—K. Shami
Attorney, Agent, or Firm—Thomas H. Jones; Guy M. Miller; John R. Manning

[57] ABSTRACT

A real-time, pre-detection optical dynamic range compression system uses a photorefractive crystal, such as $BaTiO_3$ or $LiNbO_3$, in which light induced scattering from crystal inhomogeneities of the optical input occurs as a nonlinear function of the input intensity. The greater the intensity, the faster random interference gratings are created to scatter the incident light. The unscattered portion of the optical signal is therefore reduced in dynamic range over time. The amount or range of dynamic range compression may be controlled by adjusting the time of application of the unscattered crystal output to the photodetector with regard to the time of application of the optical input to the crystal.

12 Claims, 1 Drawing Sheet

REAL TIME PRE-DETECTION DYNAMIC RANGE COMPRESSION

ORIGIN OF THE INVENTION

The invention described herein was made in the performance of work under a NASA contract, and is subject to the provisions of Public Law 96517 (35 USC 202) in which the Contractor has elected not to retain title.

TECHNICAL FIELD

The present invention relates to the processing of optical signals, and in particular, to the processing of such signals by photorefractive crystals.

BACKGROUND OF THE INVENTION

Optical signal processing techniques must handle optical signals having wide dynamic ranges, that is, signals having large differences in intensities between the strongest and weakest of such signals in the bandwidth of the input signals to be processed. The photodetectors, and other components, used in optical signal processing often have narrower dynamic ranges than the input signal to be processed.

Unless the dynamic range of the input signal is reduced before detection to within the dynamic range of the detector, information in the optical signal may be lost as a result of signals below the detector's threshold of sensitivity or signals which result in detector saturation. It is usually necessary in such applications to maintain the spatial frequency content of the input image while preventing detector saturation.

Post detection dynamic range problems have been handled by various conventional electronic dynamic range compression (DRC) techniques, but these techniques are not usable for pre-detection DRC, that is, for input signal compression before the optical signal is converted into an electrical signal by the detector.

One approach to pre-detection DRC for optical signals was proposed by the inventor hereof in a paper by Liu and Cheng: Appl. Opt., 27, 1006 (1988). In that paper, pre-detection optical DRC would be accomplished by means of beam coupling in infrared two-wave mixing using photorefractive crystals such as GaAs. Due to the response of GaAs, such devices can only be applied to near infrared input signals.

What is needed is a simpler, more convenient technique for optical pre-detection DRC, particularly for use in the spectral regions of visible signals.

BRIEF STATEMENT OF THE INVENTION

The preceding and other shortcomings of the prior art are addressed and overcome by the present invention that provides, in a first aspect, a method of optical dynamic range compression by applying an optical signal to a photorefractive crystal, and then applying a portion of the crystal output to a receiver.

In another aspect, the present invention provides a system for optical dynamic range compression, including a photorefractive crystal, means for applying an optical signal to the crystal, an optical receiver, and means for applying a portion of the crystal output to the receiver.

The dynamic range compression techniques of the present invention permit real time, pre-detection tunable DRC for optical systems.

These and other features and advantages of this invention will become further apparent from the detailed description that follows which is accompanied by a set of drawing figures. In the figures and description, numerals indicate the various features of the invention, like numerals referring to like features throughout both the drawings and the description.

BRIEF DESCRIPTION OF THE DRAWING(S)

DETAILED DESCRIPTION OF THE INVENTION

Figure 1:
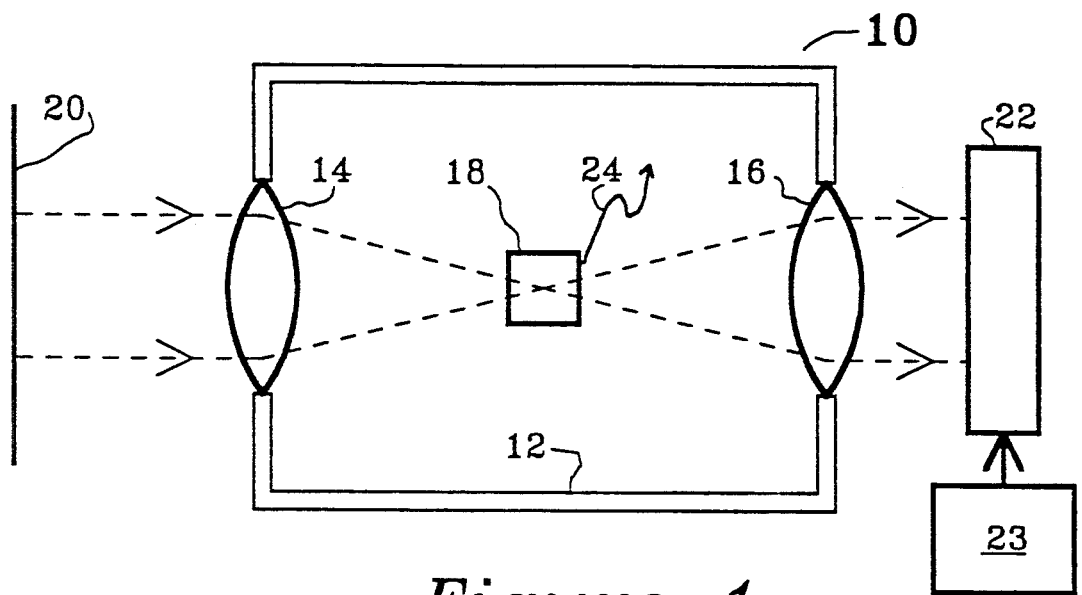
FIG. 1 is a block diagram of an optical, pre-detection DRC filter utilizing a photorefractive crystal in accordance with the present invention.

Referring now to FIG. 1, pre-detection DRC filter 10 includes housing 12, input objective lens 14 and image lens 16, mounted in openings in housing 12, and photorefractive crystal 18. Pre-detection DRC filter 10 accepts as an input a collimated beam of light, such as input image 20. For the purposes of explanation, input image 20 may be considered to be an image resulting from the application of a collimated, filtered and properly polarized beam of light from a laser, such as an Ar-ion laser, to a gray scale image transparency.

Collimated input image 20 is focussed by lens 14 upon photorefractive crystal 18. The unscattered portion of the optical beam passing through photorefractive crystal 18, which represents the dynamic range compressed output, is applied by image lens 16 to optical receiver or photodetector 22. Photodetector 22 may be a photodetector suitable for detecting the range of frequencies within input image 20. If the dynamic range of input image 20 is greater than the dynamic range of photodetector 22, some signal information may be lost unless pre-detection DRC filter 10 is employed as shown here.

Pre-detection DRC filter 10 relies for DRC on light-induced scattering from crystal inhomogeneities in photorefractive crystal 18. When a light beam is passing through a photorefractive crystal such as crystal 18, random gratings are formed by the interference between the incident beam and the light scattered by crystal inhomogeneities. The incident light is scattered further by the resultant, random interference gratings. This results in a reduction in intensity of the beam emerging directly through the crystal as the fanout of the light beam from the crystal increases nonlinearly with time. This fanout is illustrated in FIG. 1 as non-linear fanout 24.

In photorefractive crystal 18, the initial scattering ratio is higher for high intensities of the incident light because the scattered plane wave is dependent on the incident wave in a nonlinear manner. Since the scattering ratio decays faster for larger initial intensity values, the contrast of the output beam applied to photodetector 22 is lower than the contrast in input image 20. This contrast reduction is the desired DRC.

The time variation of the minimum intensity of input image 20 may be determined, as well as its maximum intensity. This information may be used to compute the time rate of change of the dynamic range normalized by the initial dynamic range. The same information may also be expressed as the normalized image contrast. Either expression will show the decay of the image intensity over time.

The range of DRC may be adjusted or tuned by varying the time between the application of input image 20 to photoretractive crystal 18 and the application of the unscattered portions of the output of photorefractive crystal 18 to photodetector 22. Photodetector 22 may be a sampling device which can adjust its sampling time relative to the application of input image 20, or the interval may be controlled by an external device, such as DRC range adjuster or tuner 23. As described in more detail below with respect to FIG. 2, tuner 23 may be used in real time to vary the dynamic range of the compression applied to input image 20 by pre-detection DRC filter 10.

Figure 2:
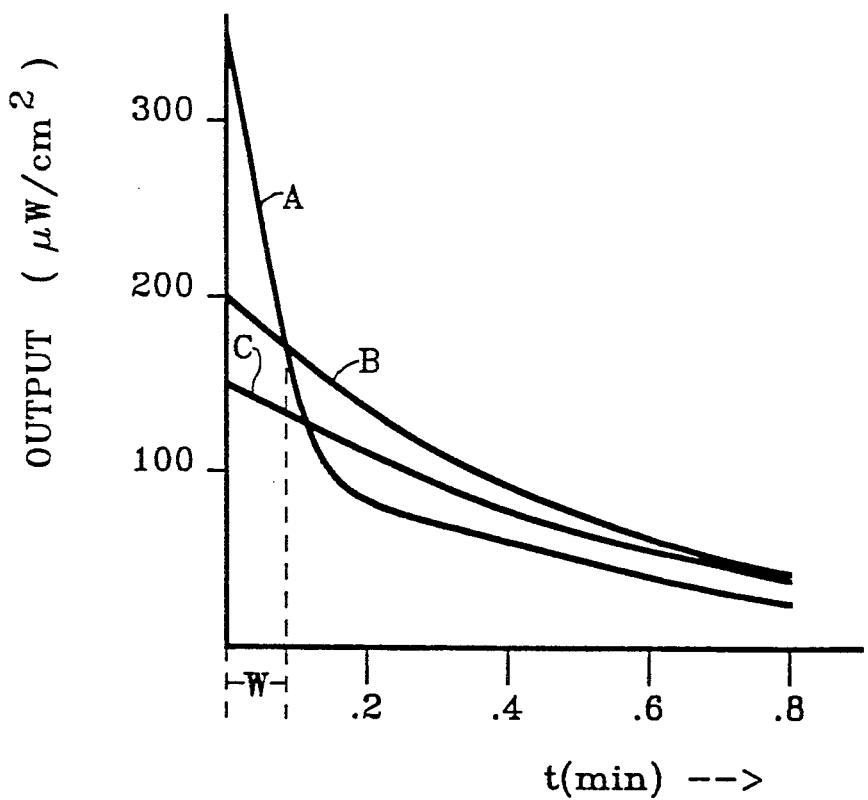
FIG. 2 is a set of graphs of output intensity, as a function of time, for several fixed intensity input signals.

Referring now to Fig. 2, exemplary output signals are graphed as a function of time to show the time variance of the compression achievable with the present invention. In particular, graph A represents the output for a particular, relatively high intensity input as a function of time. Graphs B and C represent the output amplitudes for relatively lower intensity inputs on the same time scale. As shown in the graphs in FIG. 2, for the higher the input power represented by graph A, the decay of the output power is faster than for the lower input powers, such as those represented by graphs B and C.

It is believed that the noise-based scattering diffraction gratings are established more swiftly when the input intensity is stronger. These diffraction grating scatter light away from photodetector 22. It is possible to utilize this time dependence to select or vary the range of compression during the fanout period.

For example, as shown in FIG. 2, during the time interval W, the graphs indicate that the output power decreases rapidly. Outputs measured or captured during this time interval would have substantially different ranges of compression. For particular applications, such as for detectors or other components having different dynamic ranges, the output might be sampled at one third or one half the time interval W to provide the DRC having the most appropriate dynamic range.

It is possible to select the dynamic range interactively by tuning the dynamic range in real time while observing the effects. For example, if input image 20 were a photographic image, and photodetector 22 were connected to a display, not shown, capable of displaying the resultant output image, varying the time interval at which the output image was selected with tuner 23 would permit an interactive adjustment of the contrast of the displayed output image. This contrast adjustment would be useful in permitting observation of features that would otherwise be lost as a result of the greater dynamic range of the input compared to that of photodetector 22 or other components in the image processing system.

The present invention is based on the light-induced scattering from crystal inhomogeneities in photorefractive crystals, such as $BaTiO_3$ or $LiNbO_3$. As noted above, random gratings are formed when a light beam passes through a photorefractive crystal. The gratings are formed by the interference between the incident beam and the scattered light from the crystal inhomogeneities. The incident light is further scattered by the random gratings, further reducing the intensity of the incident beam.

For example, when a strong incident wave with a wave vector $\vec{k}_i$ and intensity $I_i$ interacts with a certain scattered plane wave with wave vector $\vec{k}_s$ and intensity $I_s$, a holographic grating with wave vector $\vec{k}=\vec{k}_i-\vec{k}_s$ results. The incident wave may be diffracted in new directions, reducing the intensity of $I_i$.

Based on a set of simplified assumptions, a solution of the time evolution of the incident beam taking the wave scattering into consideration is given by:

$$\frac{I_i(t)}{I_i(o)} = \frac{1+r}{1+r\exp(\Gamma_{eff}d)}, \quad (1)$$

where $$\Gamma_{eff}=\Gamma[1-exp(-t/\tau)], \quad (2)$$

and $$\Gamma=4\pi\delta n/\lambda. \quad (3)$$

In equations (1) through (3) above, $\Gamma$ is the gain of the photorefractive material, $\delta n$ is the $\pi/2$ phase shifted part of the refractive index amplitude; the dielectric relaxation time of the crystal material, $\tau$, is equal to $\epsilon\epsilon_o/\sigma_{ph}$, where $\epsilon$ is the low-frequency relative dielectric constant and $\sigma_{ph}$ is the photoconductivity; d is the effective crystal thickness and $r=I_s(t=o)/I_i(t=o)$ is the initial scattering ratio.

The operation of the present invention is based on the assumption that the scattering ratio r shown in equation (1) above is larger for higher intensities of $I_i(o)$ because $I_s(o)$ is dependent on $I_i(o)$ in a nonlinear manner. Since $I_i(t)/I_i(o)$ decays faster for larger values of r, image contrast reduction or DRC results.

Based on this assumption, the time variation of the minimum intensity of a 2 dimensional or 2-D input image applied as input image 20, may be written as:

$$I_m(t) = \frac{(1+r_m)I_m(o)}{1+r_m e^{\Gamma_{eff}(t)d}} \quad (4)$$

and the maximum intensity may be written as:

$$I_M(t) = \frac{(1+r_M)I_M(o)}{1+r_M e^{\Gamma_{eff}(t)d}} \quad (5)$$

where $r_M>r_m$ and their values are dependent on $I_m(o)$ and $I_M(o)$.

The time rate of change of the dynamic range D normalized by the initial dynamic range $I_M(o)-I_m(o)$ may be expressed either by $$D(t) = \frac{I_M(t)-I_m(t)}{I_M(o)-I_m(o)} \quad (6)$$

or by stating the normalized image contrast C(t) as follows:

$$C(t) = \frac{I_M(t)/I_m(t)}{I_M(o)/I_m(o)} \quad (7)$$

Qualitatively, equations (6) and (7) show a decay in magnitude with respect to time.

While this invention has been described with reference to its presently preferred embodiment, its scope is not limited thereto. Rather, such scope is only limited insofar as defined by the following set of claims and includes all equivalents thereof.

What is claimed is:

1. A method of optical dynamic range compression, comprising the steps of:

applying a single optical beam including an optical signal to a photorefractive crystal;

applying a portion of the resultant crystal output to a receiver; and a range compressed version of the optical signal in the receiver at a time after the crystal output has been applied thereto.

2. The method of claim 1 wherein the photorefractive crystal is $BaTiO_3$ or $LiNbO_3$.

3. The method of claim 1 wherein the portion of the crystal output applied to the receiver includes unscattered portions of the optical beam.

4. The method of claim 1 further comprising the step of:

varying the length of time between the application of the optical beam to the crystal and the detection of the range compressed version of the optical image in the receiver to adjust the range of compression.

5. The method of claim 1 wherein the length of time between the application of the optical beam to the crystal and the detection of the range compressed version of the optical image in the receiver is sufficient to permit substantial scattering of the optical signal in the crystal.

6. The method of claim 5 wherein the scattering is nonlinearly related to the intensity of the optical signal.

7. A system for optical dynamic range compression, comprising:

a photorefractive crystal;

means for applying a single optical beam containing an optical signal to the crystal;

an optical receiver;

means for applying a portion of the resultant crystal output to the receiver; and means for detecting a range compressed version of the optical signal in the receiver at a time after the crystal output has been applied thereto.

8. The system of claim 7 wherein the photorefractive crystal comprises:

$BaTiO_3$ or $LiNbO_3$.

9. The system of claim 6 wherein the means for applying a portion of the crystal output to the receiver further comprises:

means for applying unscattered portions of the optical beam to the receiver.

10. The system of claim 6 wherein the receiver further comprises:

means for varying the length of time between the application of the optical signal to the crystal and the detection of the range compressed version of the image in the receiver in order to adjust the range of compression.

11. The system of claim 10 wherein the length of time between the application of the optical signal to the crystal and the detection of the range compressed version of the optical signal in the receiver is sufficient to permit substantial scattering of the optical signal in the crystal.

12. The system of claim 10 wherein the scattering in the crystal is nonlinearly related to the intensity of the applied optical beam.

* * * * *